US012639641B1

(12) United States Patent
Wick et al.

(10) Patent No.: US 12,639,641 B1
(45) Date of Patent: May 26, 2026

(54) EVALUATION OF PREDICTIONS AS INDIVIDUAL PROBABILITY DENSITY FUNCTIONS

(71) Applicant: Blue Yonder Group, Inc., Scottsdale, AZ (US)

(72) Inventors: Felix Christopher Wick, Thaleischweiler-Fröschen (DE); Trapti Singhal, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 348 days.

(21) Appl. No.: 17/181,652

(22) Filed: Feb. 22, 2021

Related U.S. Application Data

(60) Provisional application No. 62/987,293, filed on Mar. 9, 2020.

(51) Int. Cl.
*G06Q 10/04* (2023.01)
*G06F 17/18* (2006.01)
*G06N 20/20* (2019.01)

(52) U.S. Cl.
CPC ............. *G06Q 10/04* (2013.01); *G06F 17/18* (2013.01); *G06N 20/20* (2019.01)

(58) Field of Classification Search
CPC ...... G06Q 10/04; G06Q 10/063; G06N 20/20; G06N 20/00; G06F 17/18
USPC .......................................................... 705/1.1
See application file for complete search history.

(56) References Cited

U.S. PATENT DOCUMENTS

| | | | | |
|---|---|---|---|---|
| 10,977,336 | B2 * | 4/2021 | Unger | ....................... G06N 7/01 |
| 11,295,324 | B2 * | 4/2022 | Morgan | ................. G06N 20/20 |
| 12,182,680 | B1 * | 12/2024 | Wolf | ........................ G06N 5/04 |
| 2005/0096963 | A1 * | 5/2005 | Myr | ................... G06Q 30/0206 |
| | | | | 705/7.35 |
| 2014/0324521 | A1 * | 10/2014 | Mun | .................. G06Q 30/0201 |
| | | | | 705/7.28 |
| 2019/0156357 | A1 * | 5/2019 | Palinginis | .......... G06Q 30/0201 |
| 2020/0394594 | A1 * | 12/2020 | Dvorscak, Jr. | ......... G06Q 10/04 |

OTHER PUBLICATIONS

Donald Hebb, "The Organization of Behavior"; McGill University; New York, John Wiley $& Sons; 1949, pp. 365.*

* cited by examiner

*Primary Examiner* — Igor N Borissov

(74) *Attorney, Agent, or Firm* — Spencer Fane LLP; Steven J. Laureanti

(57) ABSTRACT

A system and method are disclosed to train machine learning models, generate predictions, and evaluate the predictions as individual probability density functions. Embodiments include a computer comprising a processor and memory and configured to train a first machine learning model to predict a mean demand of one or more items. Embodiments train a second machine learning model to predict a variance associated with the predicted mean demand. Embodiments use the first and second machine learning models and received current sales data to predict a negative binomial variance of demand of the one or more items, comprising a confidence interval specifying a stocking level for the one or more items that will satisfy a defined number of estimated outcomes. Embodiments generate an individual probability density function using the predicted mean demand of one or more items and the predicted negative binomial variance of demand, and evaluate the individual probability density function.

20 Claims, 8 Drawing Sheets

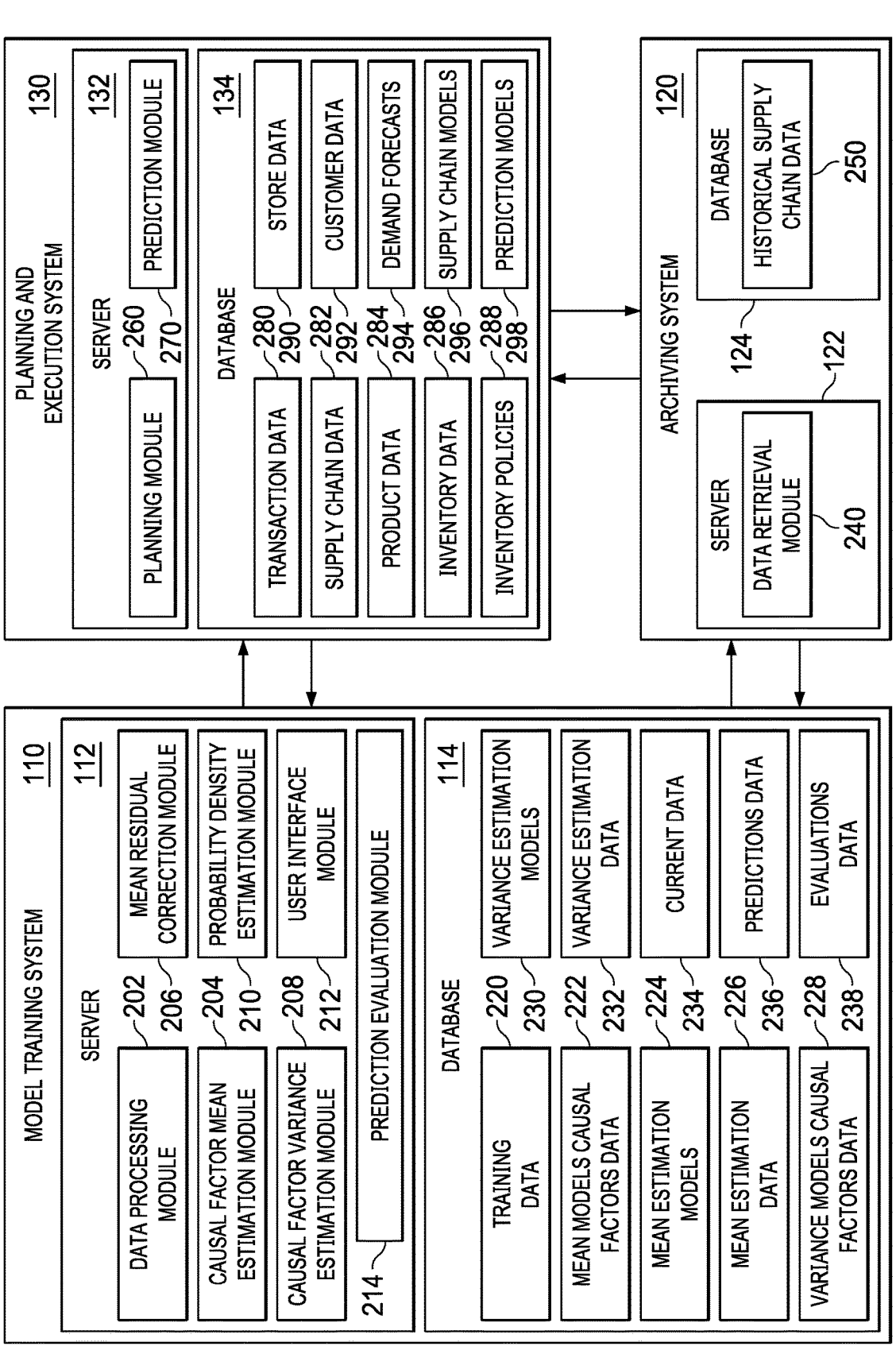

PLANNING AND EXECUTION SYSTEM 130

SERVER 132

PLANNING MODULE 260

PREDICTION MODULE 270

DATABASE 134

TRANSACTION DATA 280

STORE DATA 290

SUPPLY CHAIN DATA 282

CUSTOMER DATA 292

PRODUCT DATA 284

DEMAND FORECASTS 294

INVENTORY DATA 286

SUPPLY CHAIN MODELS 296

INVENTORY POLICIES 288

PREDICTION MODELS 298

ARCHIVING SYSTEM 120

SERVER 124

DATA RETRIEVAL MODULE 240

DATABASE 122

HISTORICAL SUPPLY CHAIN DATA 250

MODEL TRAINING SYSTEM 110

SERVER 112

DATA PROCESSING MODULE 202

MEAN RESIDUAL CORRECTION MODULE 206

CAUSAL FACTOR MEAN ESTIMATION MODULE 204

PROBABILITY DENSITY ESTIMATION MODULE 210

CAUSAL FACTOR VARIANCE ESTIMATION MODULE 208

USER INTERFACE MODULE 212

PREDICTION EVALUATION MODULE 214

DATABASE 114

TRAINING DATA 220

VARIANCE ESTIMATION MODELS 230

MEAN MODELS CAUSAL FACTORS DATA 222

VARIANCE ESTIMATION DATA 232

MEAN ESTIMATION MODELS 224

CURRENT DATA 234

MEAN ESTIMATION DATA 226

PREDICTIONS DATA 236

VARIANCE MODELS CAUSAL FACTORS DATA 228

EVALUATIONS DATA 238

302 — TRANSFER HISTORICAL DATA

304 — TRAIN MEAN AND VARIANCE ESTIMATION MODELS

306 — TRANSFER CURRENT DATA

308 — ESTIMATE MEAN DEMAND AND VARIANCE

310 — GENERATE PROBABILITY DENSITY FUNCTION

312 — EVALUATE PROBABILITY DENSITY FUNCTION QUALITY

END

502

506 — BROAD

504

EVALUATION OF PREDICTIONS AS INDIVIDUAL PROBABILITY DENSITY FUNCTIONS

CROSS-REFERENCE TO RELATED APPLICATIONS

The present disclosure is related to that disclosed in the U.S. Provisional Application No. 62/987,293, filed Mar. 9, 2020, entitled "Evaluation of Predictions as Individual Probability Density Functions." U.S. Provisional Application No. 62/987,293 is assigned to the assignee of the present application. The present invention hereby claims priority under 35 U.S.C. § 119 (e) to U.S. Provisional Application No. 62/987,293.

TECHNICAL FIELD

The present disclosure relates generally to data processing, and more particularly relates to data processing for retail and demand forecasting using causal factor forecasting powered by machine learning, individual variance estimation, probability density function generation by means of individually estimated mean and variance parameters, and probability density function evaluation by qualitative and quantitative processes.

BACKGROUND

Machine learning techniques may generate one or more machine learning models that forecast demand for products sold at one or more retail locations over a defined time period, or that provide other forecasts based on historical data. To forecast demand for a particular product/location/date combination, machine learning techniques may model the influence of exterior causal factors, such as, for example, known holidays, sales promotions, weather or events based on historical time series sales data relevant to the selected product/location/date combination. However, most existing machine learning methods may only generate a conditional mean forecast for a given product/location/date combination, where the mean is a point estimation corresponding to the mean of an underlying full probability density function (PDF) estimation. This approach does not generate uncertainty information specific to the prediction for the selected product/location/date combination and provides no confidence interval associated with the outputted model forecast. Other machine learning methods that predict full individual probability functions, for example sampling from a generative model, direct quantile regression, or estimation of the determining parameters of an assumed functional form for the PDF, typically lack quantitative or qualitative evaluation of the PDF model output to assess its correctness. This inability to quantitatively or qualitatively evaluate the PDF model output is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 2 illustrates the machine learning system, archiving system, and planning and execution system of FIG. 1 in greater detail, in accordance with an embodiment;

DETAILED DESCRIPTION

Figure 1:
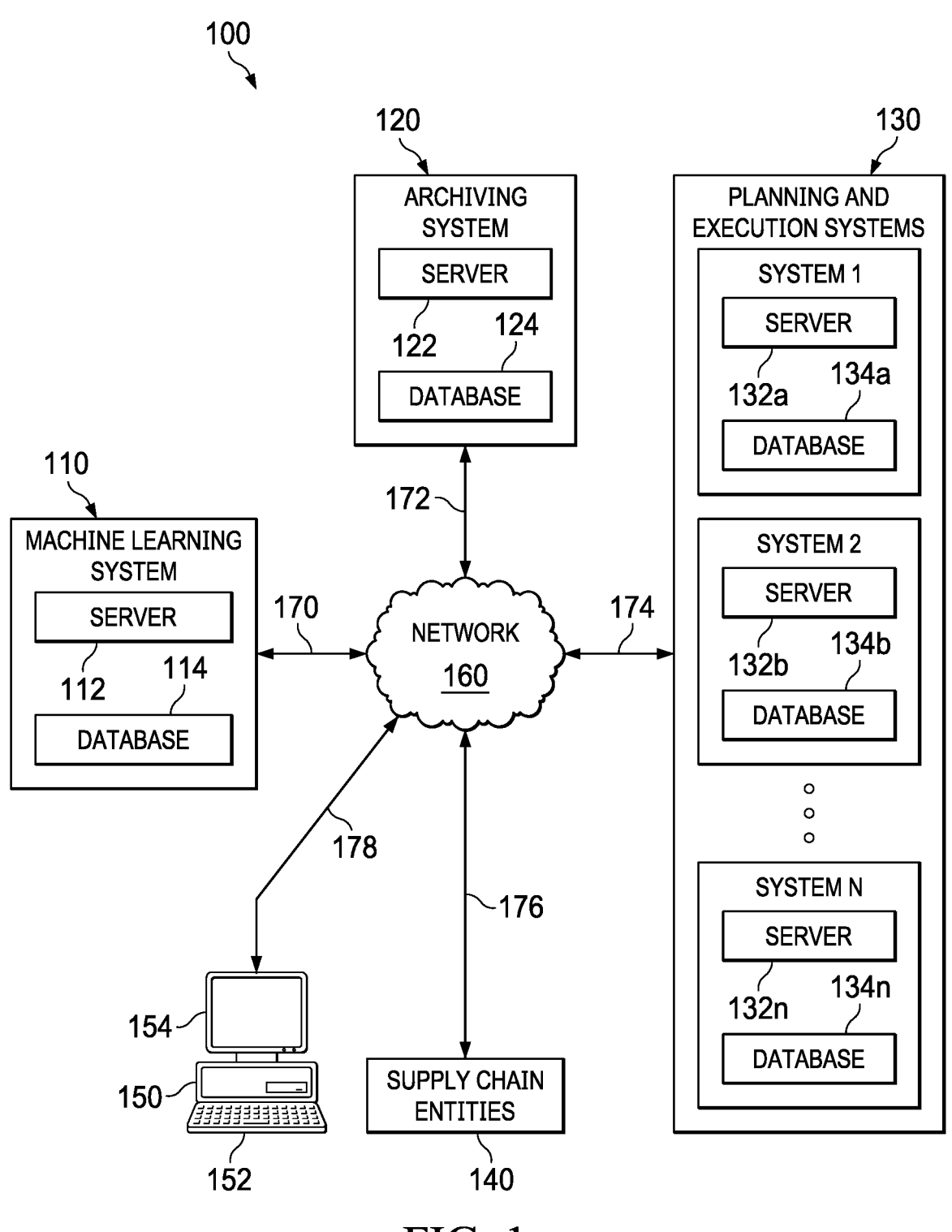
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a parametric machine learning system and method that generates one or more machine learning mean estimation models, one or more machine learning variance estimation models (including but not limited to negative binomial variance estimation models), and one or more qualitative and/or quantitative evaluations of the accuracy of the mean estimation models and variance estimation models, as well as of the validity of the underlying probability density function (PDF) model assumptions. Hereby, the evaluation methods are not limited to the case of parametric PDF estimation, but also work for all other methods to estimate a full individual PDF, e.g. quantile regression.

Both the one or more mean and variance estimation models utilize one or more causal factors X and/or historical time series data, referred to for the purposes of this disclosure as "features," from a data set of different product/location/date combinations to predict an individual mean demand volume Y (target or label) and the individual variance associated with the individual mean demand volume Y for each particular product/location/date combination, where the features may or may not differ between the mean and variance estimation models. The one or more variance estimation models may access the corresponding mean volume and use it as an additional feature to estimate the variance associated with the mean volume. The machine learning system may access the corresponding mean volume and variance, and generate one or more individual probability density functions according to a functional distribution assumption, such as, for example, a functional negative binomial distribution assumption, for each product/location/date combination. The machine learning system may evaluate the accuracy, dispersion, and form of the predicted PDF by means of comparison with actual values using one or more qualitative evaluation methods (including but not limited to cumulative distribution function histogram comparisons and inverse quantiles plots comparisons) and/or one or more quantitative evaluation methods (including but not limited to Wasserstein metric evaluation and Kullback-Leibler divergence evaluation).

Embodiments generate confidence intervals for individualized product/location/date demand volume estimates, permitting demand planners to make individualized product/location/date decisions based on machine learning forecasts with greater confidence and reliability. Embodiments evaluate predicted PDFs according to one or more metrics to test the accuracy of the mean and variance point estimations and to determine whether the mean volume estimates and estimated variances were produced by correct PDF model assumptions.

Although, for the sake of clearness, the description of demand forecasting below primarily focuses on the case of predictions of individual negative binomial probability density functions by means of its parameters mean and variance, the presented approach can be generalized to any parametric PDF that can be described by its mean and uncertainty parameters, including but not limited to a Gaussian distribution.

As alternatives to the parametric approach presented here, the full individual probability density functions of the different product/location/date combinations can also be predicted by means of sampling from a generative model or direct quantile regression. However, besides other advantages and disadvantages, these approaches are much more computationally expensive than the present invention, which is the assumption of an underlying probability density function together with the individual estimation of its parameters.

FIG. 1 illustrates exemplary supply chain network 100, in accordance with a first embodiment. Supply chain network 100 comprises machine learning system 110, archiving system 120, one or more planning and execution systems 130, one or more supply chain entities 140, computer 150, network 160, and communication links 170-178. Although single machine learning system 110, single archiving system 120, one or more planning and execution systems 130, one or more supply chain entities 140, single computer 150, and single network 160 are shown and described, embodiments contemplate any number of machine learning systems 110, archiving systems 120, one or more planning and execution systems 130, one or more supply chain entities 140, computers 150, or networks 160, according to particular needs.

In one embodiment, machine learning system 110 comprises server 112 and database 114. As described in more detail below, machine learning system 110 uses a machine learning method to (1) train a mean estimation model to estimate mean demand for each individual product/location/ date combination based on one or more causal factors and/or historical time series data; (2) train a variance estimation model to estimate the variance associated with the estimated mean demand for each product/location/date combination based on one or more causal factors and/or historical time series data, which may be different causal factors/time series data than the causal factors/time series data used to train the mean estimation model in (1); (3) use current data, the trained mean estimation model, the trained variance estimation model, and a probability density estimation module to generate a probability density function displaying the individual distribution of estimated demand outcomes; and (4) evaluate the accuracy of the individual PDF of estimated demand outcomes using one or more qualitative or quantitative evaluation methods. According to embodiments, machine learning system 110 may generate a probability density function using any method, including but not limited to negative binomial methods, parametric methods, quantile regression methods, and/or empirical methods. Machine learning system 110 may receive historical data and/or current data from archiving system 120, one or more planning and execution systems 130, one or more supply chain entities 140, and/or computer 150 of supply chain network 100. In addition, server 112 comprises one or more modules that provide a user interface (UI) that displays visualizations identifying and quantifying the contribution of external causal factors and/or residual corrections by means of lagged target time series data to an individual prediction.

Archiving system 120 of supply chain network 100 comprises server 122 and database 124. Although archiving system 120 is shown as comprising single server 122 and single database 124, embodiments contemplate any suitable number of servers 122 or databases 124 internal to or externally coupled with archiving system 120. Server 122 may support one or more processes for receiving and storing data from one or more planning and execution systems 130, one or more supply chain entities 140, and/or one or more computers 150 of supply chain network 100, as described in more detail herein. According to some embodiments, archiving system 120 comprises an archive of data received from one or more planning and execution systems 130, one or more supply chain entities 140, and/or one or more computers 150 of supply chain network 100. Archiving system 120 provides archived data to machine learning system 110 and/or planning and execution system 130 to, for example, train a machine learning model or generate a prediction with a trained machine learning model. Server 122 may store the received data in database 124. Database 124 may comprise one or more databases or other data storage arrangements at one or more locations, local to, or remote from, server 122.

According to an embodiment, one or more planning and execution systems 130 comprise server 132 and database 134. Supply chain planning and execution is typically performed by several distinct and dissimilar processes, including, for example, demand planning, production planning, supply planning, distribution planning, execution, transportation management, warehouse management, fulfilment, procurement, and the like. Server 132 of one or more planning and execution systems 130 comprises one or more modules, such as, for example, a planning module, a solver, a modeler, and/or an engine, for performing actions of one or more planning and execution processes. Server 132 stores and retrieves data from database 134 or from one or more locations in supply chain network 100. In addition, one or more planning and execution systems 130 operate on one or more computers 150 that are integral to or separate from the hardware and/or software that support archiving system 120, and one or more supply chain entities 140.

As shown in FIG. 1, supply chain network 100 comprising machine learning system 110, archiving system 120, one or more planning and execution systems 130, and one or more supply chain entities 140 may operate on one or more computers 150 that are integral to or separate from the hardware and/or software that support machine learning system 110, archiving system 120, one or more planning and execution systems 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer readable medium, magnetic computer disks, flash drives, CD-ROM, in-memory device or other suitable media to receive output from and provide input to supply chain network 100.

One or more computers 150 may include one or more processors and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from machine learning system 110, archiving system 120, one or more planning and execution systems 130, and one or more supply chain entities 140. In addition, each of the one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with machine learning system 110 and archiving system 120. These one or more users may include, for example, an "administrator" handling machine learning model training, administration of cloud computing systems, and/or one or more related tasks within supply chain network 100. In the same or another embodiment, one or more users may be associated with one or more planning and execution systems 130, and one or more supply chain entities 140.

One or more supply chain entities 140 may include, for example, one or more retailers, manufacturers, suppliers, distribution centers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Distribution centers may be any entity that organizes the shipping, stockpiling, organizing, warehousing, and distributing of one or more products. Although one example of supply chain network 100 is shown and described, embodiments contemplate any configuration of supply chain network 100, without departing from the scope described herein.

In one embodiment, machine learning system 110, archiving system 120, one or more planning and execution systems 130, supply chain entities 140, and computer 150 may be coupled with network 160 using one or more communication links 170-178. Each of communication links 170-178 may be any wireline, wireless, or other link suitable to support data communications between machine learning system 110, archiving system 120, the planning and execution systems 130, supply chain entities 140, computer 150, and network 160 during operation of supply chain network 100. Although communication links 170-178 are shown as generally coupling machine learning system 110, archiving system 120, one or more planning and execution systems 130, one or more supply chain entities 140, and computer 150 to network 160, any of machine learning system 110, archiving system 120, one or more planning and execution systems 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling machine learning system 110, archiving system 120, one or more planning and execution systems 130, one or more supply chain entities 140, and computer 150. For example, data may be maintained locally to, or externally of, machine learning system 110, archiving system 120, one or more planning and execution systems 130, one or more supply chain entities 140, and one or more computers 150 and made available to one or more associated users of machine learning system 110, archiving system 120, one or more planning and execution systems 130, one or more supply chain entities 140, and one or more computers 150 using network 160 or in any other appropriate manner. For example, data may be maintained in a cloud database at one or more locations external to machine learning system 110, archiving system 120, one or more planning and execution systems 130, one or more supply chain entities 140, and one or more computers 150 and made available to one or more associated users of machine learning system 110, archiving system 120, one or more planning and execution systems 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks 160 and other components.

Although the disclosed systems and methods are described below primarily in connection with retail demand forecasting solely for the sake of clarity, the systems and methods herein are applicable to many other applications for predicting a volume from a set of causal factors and/or historical data, including, for example, future stock and housing prices, insurance churn predictions, and drug discovery.

FIG. 2 illustrates machine learning system 110, archiving system 120, and planning and execution system 130 of FIG. 1 in greater detail, in accordance with an embodiment. Machine learning system 110 may comprise server 112 and database 114, as described above. Although machine learning system 110 is shown as comprising single server 112 and single database 114, embodiments contemplate any suitable number of servers 112 or databases 114 internal to or externally coupled with machine learning system 110.

Server 112 comprises data processing module 202, causal factor mean estimation module 204, mean residual correction module 206, causal factor variance estimation module 208, probability density estimation module 210, user interface module 212, and prediction evaluation module 214. Although server 112 is shown and described as comprising single data processing module 202, single causal factor mean estimation module 204, single mean residual correction module 206, single causal factor variance estimation module 208, single probability density estimation module 210, single user interface module 212, and single prediction evaluation module 214, embodiments contemplate any suitable number or combination of these located at one or more locations, local to, or remote from machine learning system 110, such as on multiple servers 112 or computers 150 at one or more locations in supply chain network 100.

Database 114 may comprise one or more databases 114 or other data storage arrangements at one or more locations, local to, or remote from, server 112. In an embodiment, database 114 comprises training data 220, mean models causal factors data 222, mean estimation models 224, mean estimation data 226, variance models causal factors data 228, variance estimation models 230, variance estimation data 232, current data 234, predictions data 236, and evaluations data 238. Although database 114 is shown and described as comprising training data 220, mean models causal factors data 222, mean estimation models 224, mean estimation data 226, variance models causal factors data 228, variance estimation models 230, variance estimation data 232, current data 234, predictions data 236, and evaluations data 238, embodiments contemplate any suitable number or combination of these, located at one or more locations, local to, or remote from, machine learning system 110 according to particular needs.

In one embodiment, data processing module 202 of machine learning system 110 receives data from archiving system 120, supply chain planning and execution systems 130, one or more supply chain entities 140, one or more computers 150, or one or more data storage locations local to, or remote from, supply chain network 100 and machine learning system 110, and prepares the data for use in training the one or more causal factor mean estimation models 224, causal factor variance estimation models 230, and/or other models. Data processing module 202 prepares received data for use in model training and prediction by checking received data for errors and transforming the received data. Data processing module 202 may check received data for errors in the range, sign, and/or value and use statistical analysis to check the quality or the correctness of the data. According to embodiments, data processing module 202 transforms the received data to normalize, aggregate, and/or rescale the data to allow direct comparison of received data from different planning and execution systems 130.

Causal factor mean estimation module 204 uses training data 220 to train one or more causal factor models for mean estimation by identifying causal factors and/or historical time series data and generating mean estimation models 224. Causal factor mean estimation module 204 predicts mean demand volume Y (target) for one or more product/location/date combinations using a set of identified causal factors X, that describe the strength of each factor variable contributing to the mean estimation model prediction, stored in mean models causal factors data 222 and/or historical time series data stored in training data 220. In an embodiment, causal factor mean estimation module 204 accesses training data 220 and may use a cyclic boosting process to train a mean estimation model to estimate individual product/location/date demand as a mean parameter of a negative binomial distribution (corresponding, in this embodiment, to point estimations of individual demand). In other embodiments, causal factor mean estimation module 204 may assume any other form of distribution, including but not limited to Gaussian distribution. Causal factor mean estimation module 204 stores the one or more generated mean estimation models 224 in mean estimation models 224 data of database 114.

Mean residual correction module 206 uses training data 220 and intermediary mean estimation models 224 to update mean estimation models 224 by applying individual (for example, in an embodiment, single item-store combinations) residual time series corrections using target time series data, stored in training data 220, in order to generate one or more trained models. According to embodiments, mean residual correction module 206 may generate one or more trained models that apply residual time series corrections using target time series data (including but not limited to exponential smoothing, deviation correction, recent trend capture, and/or any other post-causal factor technique that incorporates time series data to apply target residual correction) to correct, update, or modify the target variable output of one or more intermediary models. In an embodiment, mean residual correction module 206 generates two or more trained models that apply separate residual time series corrections for different time horizons to a single horizon-independent intermediary model. To provide examples only and not by way of limitation, the implementation of the residual correction (with target and predictions referring to, for example, individual item-store combinations) may include but is not limited to (1) corrected prediction=EMOV (target)/EMOV (causal prediction)*causal prediction, and (2) a deep learning approach (e.g. recurrent neural network 160) on residuals.

Causal factor variance estimation module 208 uses training data 220 and mean estimation data 226 to train one or more causal factor models for variance estimation of the variance associated with the corresponding estimated mean demands generated by causal factor mean estimation module 204 and mean residual correction module 206 by identifying causal factors and/or historical time series data and generating variance estimation models 230. Causal factor variance estimation module 208 predicts the variance of demand volume Y (target) for one or more product/location/date combinations using a set of identified causal factors X, that describe, according to embodiments, (1) the strength of each factor variable contributing to the variance estimation model prediction, stored in variance models causal factors data 228, (2) the corresponding mean estimations, and/or (3) historical time series data stored in training data 220. In an embodiment, causal factor variance estimation module 208 accesses training data 220 and mean estimation data 226, and uses a cyclic boosting process to train a variance estimation model to optimize a maximum likelihood function over all features or causal factors (such as, for example, product attributes, location attributes, product price and associated promotions, etc.) for all product/location/date combinations in training data 220 in order to subsequently estimate the variance associated with the product/location/date combination to be predicted. The one or more variance estimation models 230 trained by causal factor variance estimation module 208 may use the estimated mean demand for the selected product/location/date combination, previously generated by causal factor mean estimation module 204 and mean residual correction module 206, as a fixed input while estimating the variance associated with the product/location/date combination. Causal factor variance estimation module 208 stores the one or more generated variance estimation models 230 in variance estimation models 230 data of database 114.

Figure 4:
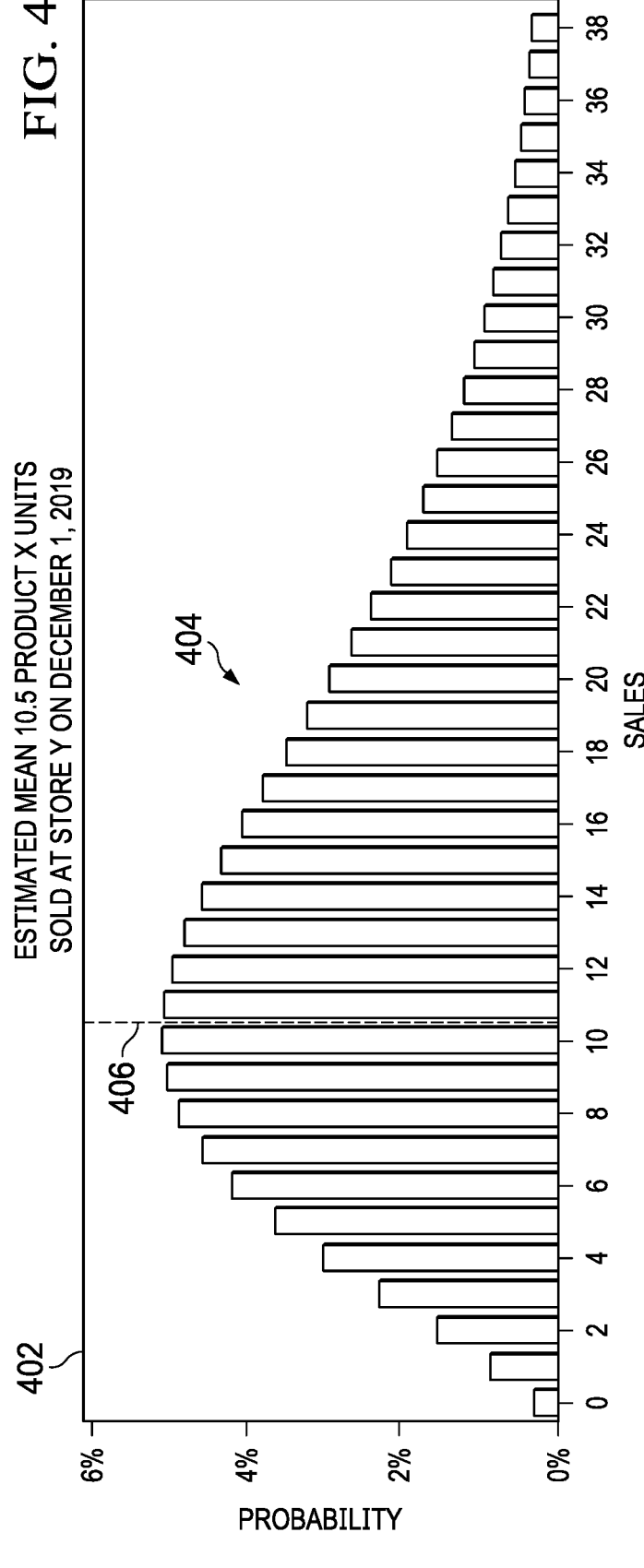
FIG. 4 illustrates an exemplary estimated probability density function display generated by a user interface module, according to an embodiment.

According to embodiments, probability density estimation module 210 accesses mean estimation data 226 (in an embodiment, comprising one or more mean estimation model outputs) and variance estimation data 232 (in an embodiment, comprising one or more variance estimation model outputs), and generates a probability density function displaying the distribution of estimated demand outcomes, an embodiment of which is illustrated by FIG. 4, for the selected product/location/date combination. In an embodiment, probability density estimation module 210 assumes a negative binomial distribution between two parameters (in this embodiment, the mean estimate generated by causal factor mean estimation module 204, and the variance estimate generated by causal factor variance estimation module 208), and uses one of any mathematical functions to generate a negative binomial distribution using two parameters to estimate the probability density of the selected product/location/date combination outcomes. Having generated a probability density function displaying the distribution of estimated demand outcomes for the selected product/location/date combination, probability density estimation module 210 stores the probability density function in predictions data 236.

In an embodiment, probability density estimation module 210 applies samples of current data 234 to one or more mean estimation models 224 to estimate mean demand, and to one or more variance estimation models 230 to estimate negative binomial variance, for one or more product/location/date combinations. In this embodiment, probability density estimation module 210 then generates a probability density function displaying the distribution of estimated outcomes based on the estimated mean demand and estimated variance, and stores the probability density function in predictions data 236. According to some embodiments, probability density estimation module 210 generates predictions at daily intervals. However, embodiments contemplate longer and shorter prediction phases that may be performed, for example, weekly, twice a week, twice a day, hourly, or the like.

User interface module 212 of machine learning system 110 generates and displays a user interface (UI), such as, for example, a graphical user interface (GUI), that displays one or more probability density functions and/or other interactive displays or visualizations of predictions and the contribution from one or more causal factors, either from the mean or variance estimation models 230, and/or residual corrections by means of lagged target time series data to the predictions. According to embodiments, user interface module 212 displays a GUI comprising interactive graphical elements for selecting one or more items, stores, or products and, in response to the selection, displaying one or more graphical elements identifying one or more probability density functions, one or more causal factors, and/or the relative importance of the one or more causal factors to the estimated demand prediction. Further, user interface module 212 may display interactive graphical elements provided for modifying future states of the one or more identified causal factors, and, in response to modifying the one or more future states of the causal factors, modifying input values to represent a future scenario corresponding to the modified futures states of the one or more causal factors. For example, embodiments of user interface module 212 provide "what if" scenario modeling and prediction for modifying a future weather variable to identify and calculate the change in a prediction based on a change in weather using historical weather data and related historical supply chain data 250. As an example only and not by way of limitation, demand for plywood changes dramatically when a hurricane is predicted to strike a particular region. To predict the influence of a hurricane on sales, machine learning system 110 modifies input values to represent a future scenario modeled by the "what if" scenario. In other embodiments, machine learning system 110 predicts, for example, the influence of one or more upcoming or potential promotions. A proper distinction between causal factors and lagged target information is crucial for what if scenarios, because the target autocorrelation is a spurious correlation due to the effect of the causal factors.

Prediction evaluation module 214 may evaluate the quality of one or more predictions generated by machine learning system 110. According to embodiments, prediction evaluation module 214 may evaluate one or more predictions using one or more qualitative evaluation methods (including but not limited to cumulative distribution function histogram comparisons and inverse quantiles plots comparisons) and/or one or more quantitative evaluation methods (including but not limited to Wasserstein metric evaluation and Kullback-Leibler divergence evaluation).

Training data 220 of machine learning system 110 database 114 comprises a selection of one or more periods of historical supply chain data 250 aggregated or disaggregated at various levels of granularity and presented to the causal factor model to generate mean estimation models 224 and variance estimation models 230. According to one embodiment, training data 220 comprises historic time series data, such as sales patterns, prices, promotions, weather conditions, and other factors influencing future demand of a particular item sold in a given store on a specific day. As described in more detail below, machine learning system 110 may receive training data 220 from archiving system 120, one or supply chain planning and execution systems 130, one or more supply chain entities 140, computer 150, or one or more data storage locations local to, or remote from, supply chain network 100 and machine learning system 110.

Mean models causal factors data 222 and variance models causal factors data 228 comprise one or more causal factors identified by causal factor mean estimation module 204 and causal factor variance estimation module 208, respectively, in the process of training the corresponding causal factor models. For the purposes of training the causal factor models, causal factors represent exterior factors that may positively or negatively influence the volume, in the case of the mean models, or uncertainty, in the case of the variance models, of sales of one or more items over one or more time periods and/or on one or more dates. As an example only and not by way of limitation, a causal factor may comprise a "Black Friday" sales day, on which, traditionally, American shoppers predictably shop and spend at a far higher rate than other sales days. Causal factor mean estimation module 204 may identify the "Black Friday" sales pattern in training data 220 by identifying that the day after "Thanksgiving Day" results in very high customer shopping and spending rates, and may store the "Black Friday" sales pattern as a causal factor in mean models causal factors data 222. Similarly, causal factor variance estimation module 208 may also identify that the "Black Friday" sales show a high level of uncertainty and store it as a causal factor in variance models causal factors data 228.

According to embodiments, causal factors may comprise, for example, any exterior factor that positively or negatively influences the volume (mean models) or uncertainty (variance models) of sales of one or more items over one or more time periods, such as: sales promotions, sales coupons, sales days, sales bundles, traditional heavy shopping days (such as but not limited to "Black Friday"), weather events (such as, for example, a heavy storm raining out roads, decreasing customer traffic and subsequent sales), political events (such as, for example, tax refunds increasing disposable customer income, or trade tariffs increasing the price of imported goods), and/or the day of the week (as a causal factor and not as lagged target time series information), or other factors influencing sales. In an embodiment, causal factors may occur on the day of the target volume to be predicted in a horizon-independent manner. For example, in an embodiment in which a trained model predicts, on Nov. 1, 2019, a sales volume Y that will occur on "Black Friday," Nov. 29, 2019, the trained model may utilize the "Black Friday" causal factor to predict sales on Nov. 29, 2019, even though the "Black Friday" causal factor has not yet occurred on the Nov. 1, 2019 date of the prediction.

Mean estimation models 224 comprise one or more machine learning models trained by causal factor mean estimation module 204 and mean residual correction module 206 to estimate mean demand volumes (such as, for example, future product demand quantities) along with causal factors and the contributing strength of each causal factor variable in contributing to the estimated mean demand. Mean estimation data 226 comprises one or more estimated mean demands outputted by the one or more mean estimation models 224.

Variance estimation models 230 comprise one or more machine learning models trained by causal factor variance estimation module 208 to estimate the variance for one or more estimated mean demands stored in mean estimation data 226. Variance estimation data 232 comprises one or more estimated variances associated with one or more estimated mean demands outputted by the one or more variance estimation models 230.

Current data 234 comprises data used to generate estimated mean demand, estimated variance, and estimated probability density for a specified product/location/date combination. According to embodiments, current data 234 comprises current sales patterns, prices, promotions, weather conditions, and other current factors influencing demand of a particular product sold in a given store location on a specific day. One or more trained mean estimation models 224 may access current data 234, output an estimated mean demand for a specified product/location/date combination, and store the estimated mean demand in mean estimation data 226. One or more trained variance estimation models 230 may access current data 234 and the estimated mean demand and estimate the variance associated with the estimated mean demand, storing the estimated variance in variance estimation data 232. Probability density estimation module 210 may access mean estimation data

226 and variance estimation data 232, and may generate a probability density function displaying the distribution of estimated outcomes for the estimated mean demand and estimated variance. Probability density estimation module 210 may store the probability density function in predictions data 236.

Predictions data 236 comprises one or more probability density functions generated by probability density estimation module 210. Evaluations data 238 comprises the quality evaluation results of one or more probability density functions, generated and stored in evaluations data 238 by prediction evaluation module 214, according to embodiments.

As described above, archiving system 120 comprises server 122 and database 124. Although archiving system 120 is shown as comprising single server 122 and single database 124, embodiments contemplate any suitable number of servers 122 or databases 124 internal to or externally coupled with archiving system 120.

Server 122 comprises data retrieval module 240. Although server 122 is shown and described as comprising single data retrieval module 240, embodiments contemplate any suitable number or combination of data retrieval modules 240 located at one or more locations, local to, or remote from archiving system 120, such as on multiple servers 122 or computers 150 at one or more locations in supply chain network 100.

In one embodiment, data retrieval module 240 of archiving system 120 receives historical supply chain data 250 from one or more supply chain planning and execution systems 130 and one or more supply chain entities 140, and stores the received historical supply chain data 250 in archiving system 120 database 124. According to one embodiment, data retrieval module 240 of machine learning system 110 may prepare historical supply chain data 250 for use as training data 220 of machine learning system 110 by checking historical supply chain data 250 for errors and transforming historical supply chain data 250 to normalize, aggregate, and/or rescale historical supply chain data 250 to allow direct comparison of data received from different planning and execution systems 130, one or more supply chain entities 140, and/or one or more other locations local to, or remote from, archiving system 120. According to embodiments, data retrieval module 240 receives data from one or more sources external to supply chain network 100, such as, for example, weather data, special events data, social media data, calendar data, and the like and stores the received data as historical supply chain data 250.

Database 124 may comprise one or more databases 124 or other data storage arrangements at one or more locations, local to, or remote from, server 122. Database 124 comprises, for example, historical supply chain data 250. Although database 124 is shown and described as comprising historical supply chain data 250, embodiments contemplate any suitable number or combination of data, located at one or more locations, local to, or remote from, archiving system 120, according to particular needs.

Historical supply chain data 250 comprises historical data received from machine learning system 110, archiving system 120, one or more supply chain planning and execution systems 130, one or more supply chain entities 140, and/or computer 150. Historical supply chain data 250 may comprise, for example, weather data, special events data, social media data, calendar data, and the like. In an embodiment, historical supply chain data 250 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As described above, planning and execution system 130 comprises server 132 and database 134. Although planning and execution system 130 is shown as comprising single server 132 and single database 134, embodiments contemplate any suitable number of servers 132 or databases 134 internal to or externally coupled with planning and execution system 130.

Server 132 comprises planning module 260 and prediction module 270. Although server 132 is shown and described as comprising single planning module 260 and single prediction module 270, embodiments contemplate any suitable number or combination of planning modules 260 and prediction modules 270 located at one or more locations, local to, or remote from planning and execution system 130, such as on multiple servers 132 or computers 150 at one or more locations in supply chain network 100.

Database 134 may comprise one or more databases 134 or other data storage arrangements at one or more locations, local to, or remote from, server 132. Database 134 comprises, for example, transaction data 280, supply chain data 282, product data 284, inventory data 286, inventory policies 288, store data 290, customer data 292, demand forecasts 294, supply chain models 296, and prediction models 298. Although database 134 is shown and described as comprising transaction data 280, supply chain data 282, product data 284, inventory data 286, inventory policies 288, store data 290, customer data 292, demand forecasts 294, supply chain models 296, and prediction models 298, embodiments contemplate any suitable number or combination of data, located at one or more locations, local to, or remote from, supply chain planning and execution system 130, according to particular needs.

Planning module 260 of planning and execution system 130 works in connection with prediction module 270 to generate a plan based on one or more predicted retail volumes, classifications, or other predictions. By way of example and not of limitation, planning module 260 may comprise a demand planner that generates a demand forecast for one or more supply chain entities 140. Planning module 260 may generate the demand forecast, at least in part, from predictions and calculated factor values for one or more causal factors received from prediction module 270. By way of a further example, planning module 260 may comprises an assortment planner and/or a segmentation planner that generates product assortments that match causal effects calculated for one or more customers or products by prediction module 270, which may provide for increased customer satisfaction and sales, as well as reducing costs for shipping and stocking products at stores where they are unlikely to sell.

Prediction module 270 of planning and execution system 130 applies samples of transaction data 280, supply chain data 282, product data 284, inventory data 286, store data 290, customer data 292, demand forecasts 294, and other data to prediction models 298 to generate predictions and calculated factor values for one or more causal factors. In an embodiment, prediction module 270 may predict a volume Y (target) from a set of causal factors X along with causal factors strengths that describe the strength of each causal factor variable contributing to the predicted volume. According to some embodiments, prediction module 270 generates predictions at daily intervals. However, embodiments contemplate longer and shorter prediction phases that may be performed, for example, weekly, twice a week, twice a day, hourly, or the like.

Transaction data 280 of database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like.

Supply chain data 282 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 284 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 286 in database 134, which may be used by planning and execution system 130 to place orders, set inventory levels at one or more stocking points, initiate manufacturing of one or more components, or the like in response to, and based at least in part on, a forecasted demand of machine learning system 110.

Inventory policies 288 may comprise any suitable inventory policy describing the reorder point and target quantity, or other inventory policy parameters that set rules for machine learning system 110 and/or planning and execution system 130 to manage and reorder inventory. Inventory policies 288 may be based on target service level, demand, cost, fill rate, or the like. According to embodiments, inventory policies 288 comprise target service levels that ensure that a service level of one or more supply chain entities 140 is met with a certain probability. For example, one or more supply chain entities 140 may set a service level at 95%, meaning supply chain entities 140 will set the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, machine learning system 110 and/or planning and execution system 130 may determine a replenishment order according to one or more replenishment rules, which, among other things, indicates to one or more supply chain entities 140 to determine or receive inventory to replace the depleted inventory. As an example only and not by way of limitation, an inventory policy for non-perishable goods with linear holding and shorting costs comprises a min./max. (s,S) inventory policy. Other inventory policies 288, such as minimization of a cost function consisting of different terms for waste and lost sales costs, may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data.

Customer data 292 may comprise customer identity information, including, for example, customer relationship management data, loyalty programs, and mappings between product purchases and one or more customers so that a customer associated with a transaction may be identified. Customer data 292 may comprise data relating customer purchases to one or more products, geographical regions, store locations, or other types of dimensions.

Demand forecasts 294 may indicate future expected demand based on, for example, any data relating to past sales, past demand, purchase data, promotions, events, or the like of one or more supply chain entities 140. Demand forecasts 294 may cover a time interval such as, for example, by the minute, hour, daily, weekly, monthly, quarterly, yearly, or any other suitable time interval, including substantially in real time. Demand may be modeled as, for example, a negative binomial or Poisson-Gamma distribution. According to other embodiments, the model also takes into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. If each location of this exemplary supermarket is open every day of the year, planning and execution system 130 comprising a demand planner would need to calculate approximately $2 \times 10^{10}$ demand forecasts 294 each day to derive the optimal order volume for the next delivery cycle (e.g. three days).

Supply chain models 296 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 296 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Prediction models 298 comprise one or more of variance estimation models 230 used by planning and execution system 130 for predicting a retail volume, such as, for example, a forecasted demand volume for one or more items at one or more stores of one or more retailers.

Figure 3:
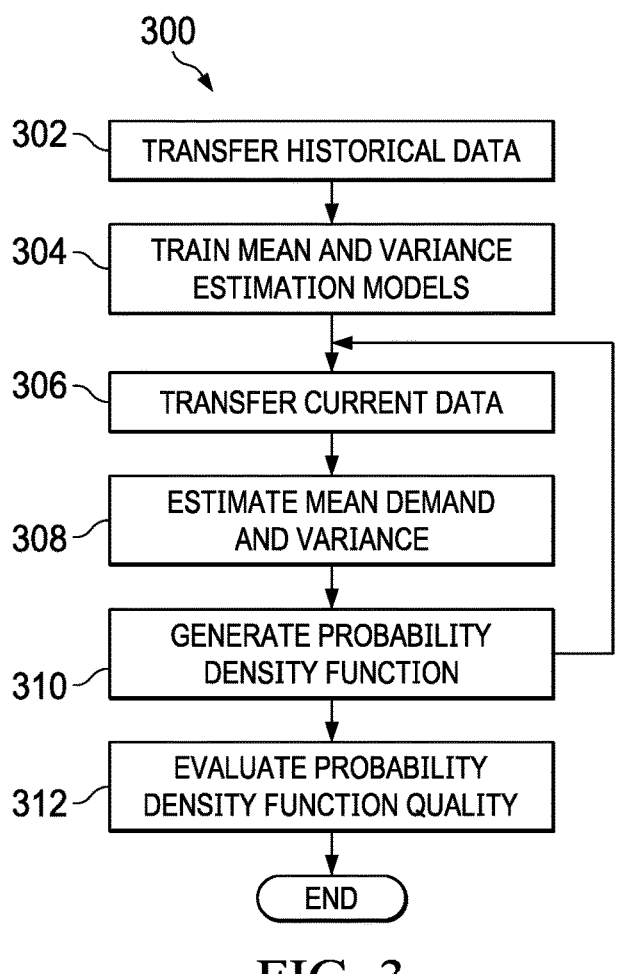
FIG. 3 illustrates an exemplary method of training machine learning models to estimate mean and variance of individual product/location/date combinations, predict an individual probability density function for a particular product/location/date combination, and evaluate the quality of the probability density function, according to an embodiment.

FIG. 3 illustrates exemplary method 300 of training machine learning models to estimate mean and variance of individual product/location/date combinations, predict an individual probability density function for a particular product/location/date combination, and evaluate the quality of the probability density function, according to an embodiment. Method 300 proceeds by one or more actions, which although described in a particular order, may be performed in one or more permutations, according to particular needs.

At action 302, data processing module 202 of machine learning system 110 transfers historical data from archiving system 120, and/or transaction data 280, supply chain data 282, product data 284, inventory data 286, store data 290, and/or customer data 292 from planning and execution system 130, into training data 220. In other embodiments, data retrieval module 240 of archiving system 120 may transfer historical supply chain data 250 from archiving system 120 to training data 220 of machine learning system 110 database 114.

At action 304, causal factor mean estimation module 204 trains one or more mean estimation models 224 and causal factor variance estimation module 208 trains one or more variance estimation models 230. In an embodiment, causal factor mean estimation module 204 accesses training data 220 and the product/location/date combinations stored therein, and uses training data 220 to train the causal factor model and generate one or more mean estimation models 224 by identifying, from training data 220, historical sales data and/or one or more causal factors as well as the strengths with which each of the one or more causal factors contributes to the estimated mean demand output of the one or more mean estimation models 224. According to embodiments, causal factor mean estimation module 204 may use any machine learning process, including but not limited to a cyclic boosting process, to identify historical data and/or one or more causal factors, train one or more causal factor models, and/or generate one or more mean estimation models 224. Causal factor mean estimation module 204 identifies causal factors and stores the causal factors in mean models causal factors data 222. Causal factor mean estimation module 204 stores the one or more generated mean estimation models 224 in mean estimation models 224 data of database 114. In an embodiment, causal factor mean estimation module 204 applies mean estimation models 224 data to the mean estimation model to predict all samples of training data 220 and the resulting predictions are subsequently updated by a residual correction using lagged target time series information and in turn stored in mean estimation data 226.

Continuing action 304, causal factor variance estimation module 208 trains one or more variance estimation models 230 using training data 220 and mean estimation data 226. In an embodiment, causal factor variance estimation module 208 accesses training data 220 and the product/location/date combinations stored therein, as well as mean estimation data 226, and trains a cyclic boosting causal factor model to learn a variance by optimizing a maximum likelihood function over all features (such as, for example, product attributes, location attributes, product price and associated promotions, and the like), including a corresponding individual mean estimation predicted by one or more mean estimation models 224 for each product/location/date combination, considering all product/location/date combinations. Causal factor variance estimation module 208 identifies causal factors and stores the causal factors in variance models causal factors data 228. Causal factor variance estimation module 208 stores the one or more generated variance estimation models in variance estimation models 230.

As an example only and not by way of limitation, in an embodiment, a variance estimation model may estimate the variance associated with each estimated mean demand by minimizing the negative log-likelihood function L(r), see equation (2), with respect to the dispersion parameter r over all input samples $x_i$ and the product sales samples $y_i$ (target). The variance estimation model may then calculate the variance using, in part, equation (1) below, where μ is the estimated mean demand parameter and $\sigma^2$ is the estimated variance parameter:

$$\sigma^2 = \mu + \frac{\mu^2}{r} \tag{1}$$

$$NB(y; \mu, r) = \frac{\Gamma(r+y)}{y! \cdot \Gamma(r)} \cdot \left(\frac{r}{r+\mu}\right)^r \cdot \left(\frac{\mu}{r+\mu}\right)^y \tag{2}$$

$$L(r) = -\mathcal{L}(r) = -\ln \sum_i NB(y_i; \hat{\mu}_i, \hat{r}_i)$$

$$\hat{r}_i = 1 + \frac{1}{\prod_{j=1}^{p} f_j^k} \text{ with } k = \{x_{j,i} \in b_j^k\}$$

In an embodiment, together with the estimated mean demand parameter μ from the cyclic boosting mean estimation model, all parameters of a negative binomial desntiy (nbinom (y; r, μ)) are given and the parameter r is a number in the interval [1, ∞]. In an embodiment, the variance estimation model uses a cyclic boosting process to minimize parameters for one input feature at a time until convergence occurs.

At action 306, data processing module 202 transfers current data 234 from archiving system 120, and/or transaction data 280, supply chain data 282, product data 284, inventory data 286, store data 290, and/or customer data 292 from planning and execution system 130, into current data 234 of machine learning system 110 database 114.

At action 308, one or more mean estimation models 224 may access current data 234, generate an estimated mean demand for all current or selected product/location/date combinations using current data 234, and store the estimated mean demand in mean estimation data 226. Similarly, one or more variance estimation models 230 may access current data 234, generate an estimated variance of the demand for all current or selected product/location/date combinations using current data 234, and store the estimated variance in variance estimation data 232.

At action 310, probability density estimation module 210 generates a probability density function to display the distribution of estimated demand outcomes. In an embodiment, probability density estimation module 210 accesses mean estimation data 226 (as a first parameter) and variance estimation data 232 (as a second parameter), assumes a specific distribution (such as, for example, a negative binomial distribution) between the two parameters, and uses one of any mathematical functions (such as, for example, a negative binomial distribution mathematical function) to generate a distribution using two parameters to estimate the probability density of the estimated demand outcomes. Having generated a probability density function displaying the distribution of estimated demand outcomes for a selected product/location/date combination, probability density estimation module 210 stores the probability density function in predictions data 236. In other embodiments, probability density estimation module 210 may access mean estimation data 226 and variance estimation data 232 previously generated and stored in current data 234 to generate the probability density function, according to particular needs.

In an embodiment, user interface module 212 may access predictions data 236 and display one or more probability density estimations. In other embodiments, user interface module 212 may generate one or more interactive graphical elements providing for modifying future states of the one or more product/location/date combinations and/or one or more causal factors and, in response to modifying the one or more future states of the product/location/date combinations and/or one or more causal factors, modifying input values to represent a future scenario corresponding to the modified futures states of the one or more product/location/date combinations and/or one or more causal factors.

By way of example only and not by way of limitation, in an embodiment, machine learning system 110 may repeatedly execute actions 306, 308, and 310 described above to (1) access up-to-date current data 234, (2) generate estimated mean demands and variance estimations for current data 234 using mean estimation models 224 and variance estimation models 230, and (3) generate a probability density function to display the distribution of estimated demand outcomes (such as, for example, estimated mean demands, variances, and probability density functions for different product/location/days). In an embodiment, probability density estimation module 210 may store each probability density function in predictions data 236.

At action 312, prediction evaluation module 214 accesses predictions data 236 and evaluates the quality of the probability density estimations stored in predictions data 236 by comparing the probability density estimations to one or more quantities of known data or observed data (such as, for example, comparing predicted sales probability density estimations for sales on Jul. 1-30, 2019 to subsequent known sales data for Jul. 1-30, 2019 after such sales occur). According to embodiments, prediction evaluation module 214 may evaluate the accuracy of probability density estimations compared to known data or observed data using one or more qualitative evaluation methods (including but not limited to cumulative distribution function histogram comparisons (best illustrated by FIGS. 5 and 6A-6D) and inverse quantiles plots comparisons (best illustrated by FIGS. 7A-7B)) and/or one or more quantitative evaluation methods (including but not limited to Wasserstein metric evaluation and Kullback-Leibler divergence evaluation). These examples of qualitative and quantitative evaluation methods are provided as examples only, and prediction evaluation module 214 may use any evaluation method to evaluate the accuracy of the one or more probability density estimations stored in predictions data 236 as compared with known or observed data, according to particular needs. Prediction evaluation module 214 may store the evaluation results of one or more probability density estimations in evaluations data 238 of machine learning system 110 database 114. In an embodiment, user interface module 212 may access evaluations data 238 and display one or more evaluation results on one or more displays. Machine learning system 110 then terminates method 300.

To illustrate the operation of machine learning system 110 estimating an individual probability density function for an individual product/location/date combination and evaluating the quality of the probability density function, the following example is now given. In this example, machine learning system 110 executes the actions of method 300 to train a demand model on a data set with a series of particular dates (in this example, Dec. 1, 2017-Nov. 30, 2019), including a particular product (in this example, "Product X") sold at a particular location (in this example, "Store Y"), to predict demand and variance for Product X at Store Y on Dec. 1-30, 2019 based on current data 234, and then to evaluate the quality of the predictions using a cumulative distribution function histogram comparison qualitative evaluation method. In this example, machine learning system 110 trains a variance estimation model to estimate the negative binomial variance associated with the estimated mean demand for Product X at Store Y on Dec. 1-30, 2019; in other embodiments, machine learning system 110 may estimate variance using parametric methods, quantile regression methods, empirical methods, or any other probability density functions. In this example, probability density estimation module 210 of machine learning system 110 uses the estimated mean demand and estimated negative binomial variance for Product X at Store Y on Dec. 1-30, 2019 to generate probability density functions displaying the distribution of estimated demand outcomes for Product X at Store Y on Dec. 1-30, 2019. Although particular examples of machine learning system 110, mean estimation models 224, and variance estimation models 230 are illustrated and described herein, embodiments contemplate machine learning system 110 executing the actions of method 300 to identify any causal factors, generate any mean estimation models 224 and variance estimation models 230, generate any forms of probability density functions according to any density assumptions (including but not limited to negative binomial density assumptions, Gaussian density assumptions, Poisson-Gamma density assumptions), and evaluate the accuracy of probability density functions according to any metrics, according to particular needs.

In this example, at action 302, data processing module 202 of machine learning system 110 server 112 transfers historical product sales data from archiving system 120 into training data 220 of machine learning system 110 database 114. In this example, user interface module 212 responds to one or more computer 150 inputs to select a particular product/location/date combination for which to execute the actions of method 300. In this example, user interface module 212, responding to computer 150 keyboard input, selects sales of Product X at Store Y on Dec. 1-30, 2019 as the relevant product/location/date combinations. Having selected particular product/location/date combinations, user interface module 212 stores the product/location/date combination in current data 234.

Continuing with this example, and at action 304, causal factor mean estimation module 204 trains a mean estimation model in the form of a cyclic boosting machine learning algorithm using all product/location/date combinations in training data 220. Causal factor mean estimation module 204 identifies causal factors as well as the strengths with which each of the one or more causal factors contributes to the estimated mean demand outputs of the mean estimation model and stores the causal factors in mean models causal factors data 222. Causal factor mean estimation module 204 stores the mean demand estimation model in mean estimation models 224 data. Causal factor mean estimation module 204 applies mean estimation models 224 data to the mean estimation model to predict all samples of training data 220 and the resulting predictions are subsequently updated by a residual correction using lagged target time series information and in turn stored in mean estimation data 226.

Continuing with this example and action 304, causal factor variance estimation module 208 trains a variance estimation model using training data 220 and mean estimation data 226. In this example, causal factor variance estimation module 208 accesses training data 220 and mean estimation data 226 and uses a cyclic boosting model to train the variance estimation model by optimizing a maximum likelihood function. Causal factor variance estimation module 208 stores the variance estimation model in variance estimation models 230 data of database 114.

Continuing with this example, and at action 306, data processing module 202 transfers current data 234 from archiving system 120 into current data 234 of machine learning system 110 database 114, in order to execute actions 308 and 310 for Dec. 1, 2019, the first day of the 30 days that were previously chosen as the relevant product/location/date combinations. At action 308, the mean demand estimation model accesses current data 234 of machine learning system 110 database 114, generates an estimated mean demand of 10.5 units of Product X sold at Store Y on Dec. 1, 2019, and stores the estimated mean demand prediction in mean estimation data 226. To predict the variance associated with the Product X/Store Y/Dec. 1, 2019 combination, the variance estimation model accesses current data 234 and mean estimation data 226, generates an estimated negative binomial variance for the Product X/Store Y/Dec. 1, 2019 combination, and stores the estimated variance in variance estimation data 232.

Continuing with this example, and at action 310, probability density estimation module 210 generates a probability density function to display the distribution of estimated demand outcomes for the Product X/Store Y/Dec. 1, 2019 combination. In in this example, probability density estimation module 210 accesses mean estimation data 226 of 10.5 units sold as a first parameter, and variance estimation data 232 as a second parameter, and assumes a negative binomial distribution between the two parameters. Probability density estimation module 210 uses a mathematical function to generate a negative binomial distribution using the estimated mean demand and estimated variance parameters to estimate the probability density of the estimated demand outcomes. Probability density estimation module 210 stores the Product X/Store Y/Dec. 1, 2019 estimated probability density function outcomes in predictions data 236. User interface module 212 accesses predictions data 236 and displays the Product X/Store Y/Dec. 1, 2019 estimated probability density function outcomes on an estimated probability density function display 402, illustrated by FIG. 4.

FIG. 4 illustrates exemplary estimated probability density function display 402 generated by user interface module 212, according to an embodiment. In this embodiment, estimated probability density function display 402 illustrates estimated demand outcomes 404 for the Product X/Store Y/Dec. 1, 2019 combination, generated by the mean estimation model, variance estimation model, and probability density estimation module 210. Although particular examples of estimated probability density function displays 402 are illustrated and described herein, embodiments contemplate user interface module 212 generating probability density function displays of any configuration and displaying any database data, according to particular needs.

Continuing with this example, estimated probability density function display 402 illustrates estimated mean demand outcome 406 of 10.5 Product X units sold at Store Y on Dec. 1, 2019, with the estimated variance, previously calculated by the variance estimation model, applied by probability density estimation module 210 in a negative binomial distribution. Estimated probability density function display 402 illustrated by FIG. 4 indicates that the majority of estimated demand outcomes 404 for Product X units sold at Store Y on Dec. 1, 2019 fall relatively close to the 10.5 units of estimated mean demand outcome 406. However, a non-zero number of possible sales outcomes predict significantly lower Product X units sold at Store Y on Dec. 1, 2019 (illustrated on the left edge of estimated probability density function display 402 horizontal axis), including a sales outcome comprising no Product X units sold at all. Additionally, a non-zero number of possible sales outcomes predict significantly higher demand for Product X units (illustrated on the right edge of estimated probability density function display 402 horizontal axis). In this embodiment, and for the sake of clarity, user interface module 212 terminates estimated probability density function display 402 at 38 Product X units at Store Y on Dec. 1, 2019, although additional low-probability sales outcomes of greater than 38 Product X units at Store Y on Dec. 1, 2019 may remain. In an embodiment in which a demand planner strictly follows estimated mean demand outcome 406 of 10.5 Product X units, and makes 11 units of Product X at Store Y on Dec. 1, 2019 available for sale, very low demand at the left edge of estimated probability density function display 402 will result in significant overstocking of Product X at Store Y and associated overstock costs. Conversely, very high demand at the right edge of estimated probability density function display 402 will result in missed Product X sales that otherwise could have been sold at Store Y on Dec. 1, 2019, decreasing revenue and profits accordingly.

Continuing with this example, machine learning system 110 returns to action 306, and executes actions 306, 308, and 310 described above for each remaining day from Dec. 2-30, 2019. Probability density estimation module 210 stores the Product X/Store Y/Dec. 2-30, 2019 estimated probability density function outcomes in predictions data 236.

Continuing with this example, as actual sales of Product X at Store Y from Dec. 1-30, 2019 occur, machine learning system 110 stores sales data recording the actual sales of Product X at Store Y on Dec. 1-30, 2019 in current data 234. At action 312, to evaluate the accuracy of machine learning system 110 mean and variance estimations and the correctness of the Product X/Store Y/Dec. 1-30, 2019 estimated probability density function outcomes, prediction evaluation module 214 accesses the Product X/Store Y/Dec. 1-30, 2019 estimated probability density function outcomes stored in predictions data 236 and the actual sales data for Product X at Store Y on Dec. 1-30, 2019. In this example, prediction evaluation module 214 evaluates the quality of the Product X/Store Y/Dec. 1-30, 2019 estimated probability density function outcomes as compared to the observed data using a cumulative distribution function (CDF) histogram, illustrated by FIG. 5. Prediction evaluation module 214 stores the evaluation results of the Product X/Store Y/Dec. 1-30, 2019 estimated probability density function outcomes as compared to the observed data in evaluations data 238. In this example, user interface module 212 accesses the evaluation data and displays the Product X/Store Y/Dec. 1-30, 2019 estimated probability density function evaluation results on CDF histogram display 502.

Figure 5:
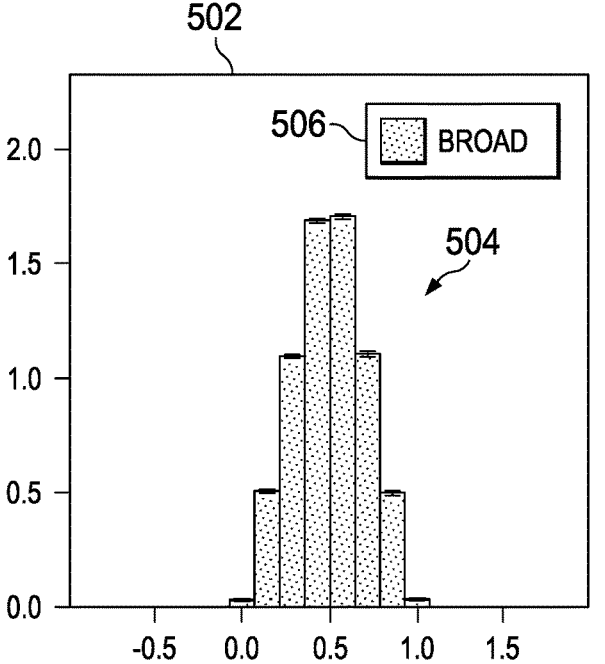
FIG. 5 illustrates an exemplary cumulative distribution function (CDF) histogram display generated by the user interface module, according to an embodiment.

FIG. 5 illustrates exemplary CDF histogram display 502 generated by user interface module 212, according to an embodiment. In this embodiment, CDF histogram display 502 illustrates estimated probability density function outcomes 504 for the Product X/Store Y/Dec. 1-30, 2019 combinations, compared to the actual sales values observed and recorded from Dec. 1-30, 2019. Although particular examples of CDF histogram displays 502 and estimated probability density function outcomes 504 are illustrated and described herein, embodiments contemplate user interface module 212 generating probability density function displays and/or CDF histogram displays 502 of any configuration and displaying any database 114 data, according to particular needs.

As illustrated by FIG. 5, CDF histogram display 502 indicates a specific distribution of the quantiles of all actual observed sales values in the respective corresponding predicted PDFs, hinting at too broad PDFs in average. In the embodiment illustrated by FIG. 5, user interface module 212 may indicate that the corresponding predicted PDFs are too broad with broad warning 506. If all assumptions made by machine learning system 110 are correct (i.e., if the mean and variance estimations are accurate and if the (approximately) correct choice of probability density function estimation (whether negative binomial or any other method) is made), a flat uniform distribution should occur for the histogram of quantiles (best illustrated by FIG. 6D). Because the example illustrated in FIG. 5 displays a broad distribution instead of a flat uniform distribution, machine learning system 110 determines that causal factor variance estimation module 208, during action 304 of method 300, trained an inaccurate (in this example overpredicted) variance estimation model using training data 220 and mean estimation data 226. Concluding this particular example, machine learning system 110 returns to action 302 to train subsequent and more accurate machine learning models.

FIGS. 6A-6D illustrate alternative CDF histogram displays 602a-602d generated by user interface module 212, according to embodiments. Alternative CDF histogram displays 602a-602d may comprise estimated probability density function outcomes 604a-604d, over warning 608, under warning 610, narrow warning 612, and uniform indicator 614. Although FIGS. 6A-6D illustrate alternative CDF histogram displays 602a-602d in particular configurations, embodiments contemplate user interface module 212 generating probability density function displays and/or alternative CDF histogram displays 602a-602d of any configuration and displaying any database 114 data, according to particular needs.

Figure 6A:
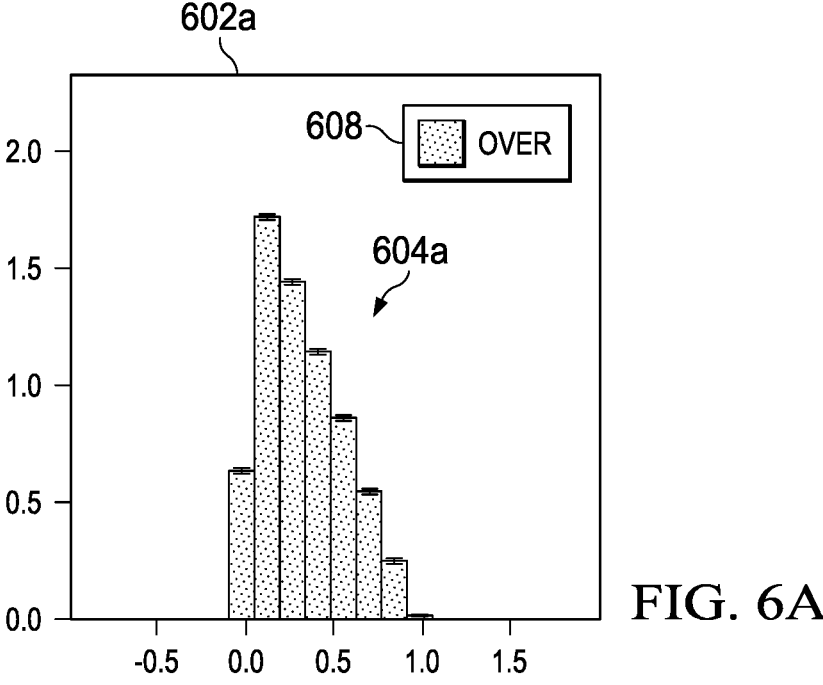
FIGS. 6A-6D illustrate alternative CDF histogram displays generated by the user interface module, according to embodiments.
Figure 6B:
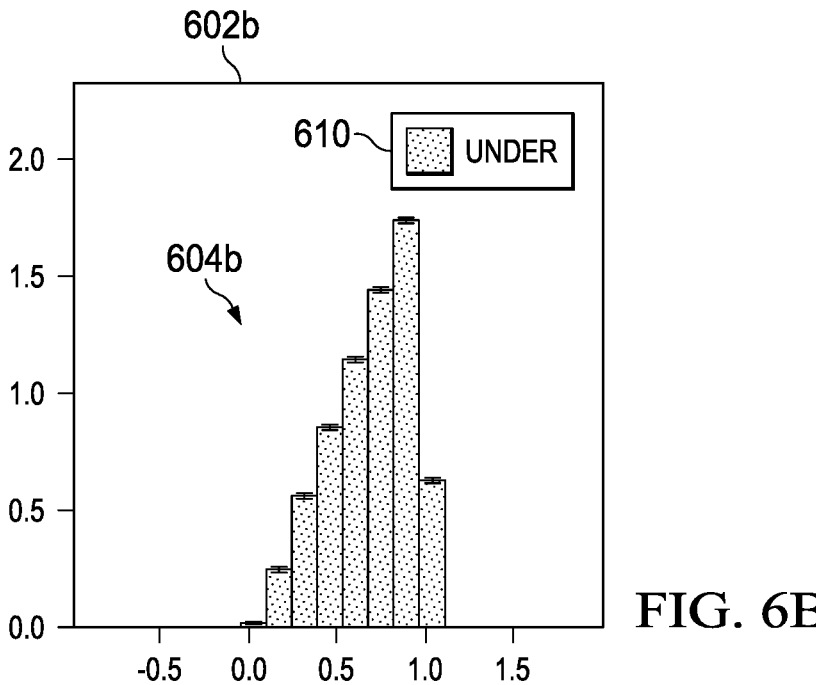
Figure 6C:
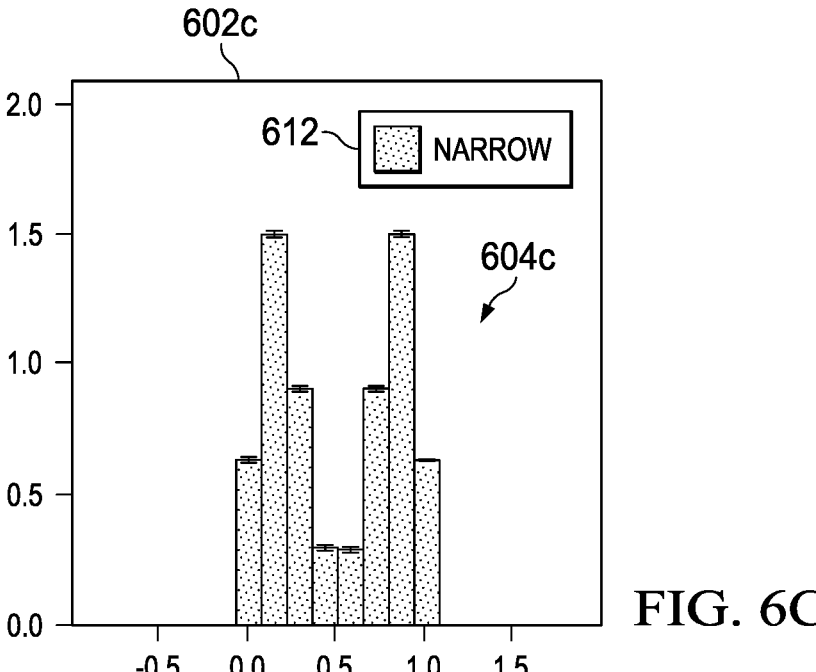
Figure 6D:
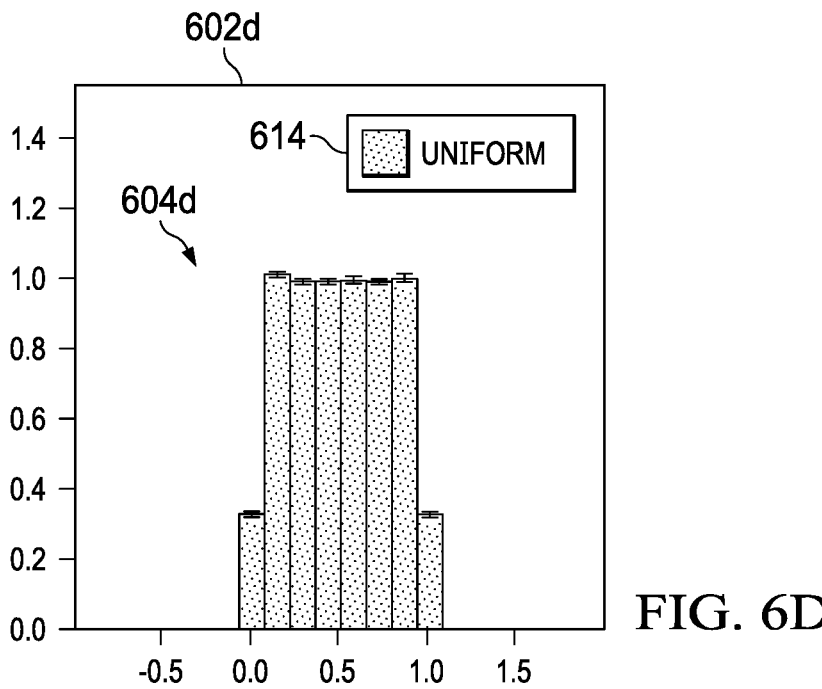

The embodiments illustrated by FIGS. 6A and 6B indicate that the mean estimation model, in the embodiments illustrated by FIGS. 6A and 6B, has not generated accurate mean estimates, leading to distributions other than the flat uniform distribution that indicates correct model assumptions. Similarly, the embodiment illustrated by FIG. 6C indicates that the variance estimation model, in the example illustrated by FIG. 6C, has not generated accurate variance estimations. Only the embodiment illustrated by FIG. 6D, in which a flat uniform distribution is apparent and user interface module 212 displays uniform indicator 614, suggests that the mean and variance estimations generated by machine learning system 110, as well as the choice of underlying PDF (such as but not limited to negative binomial distribution or quantile regression) were correct in that embodiment.

Figure 7A:
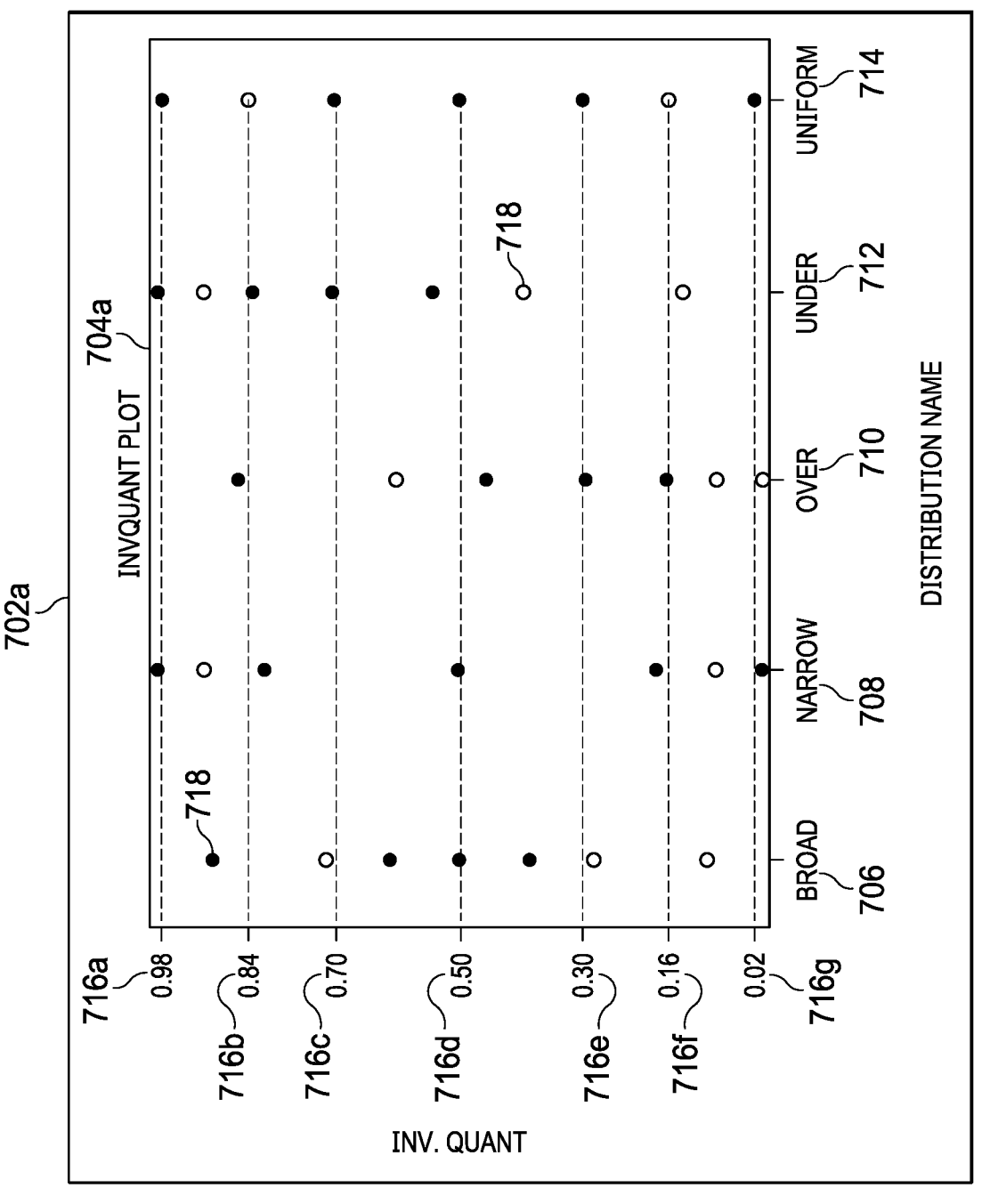
FIGS. 7A-7B illustrate exemplary inverse quantile plot displays generated by the user interface module, according to an embodiment.
Figure 7B:
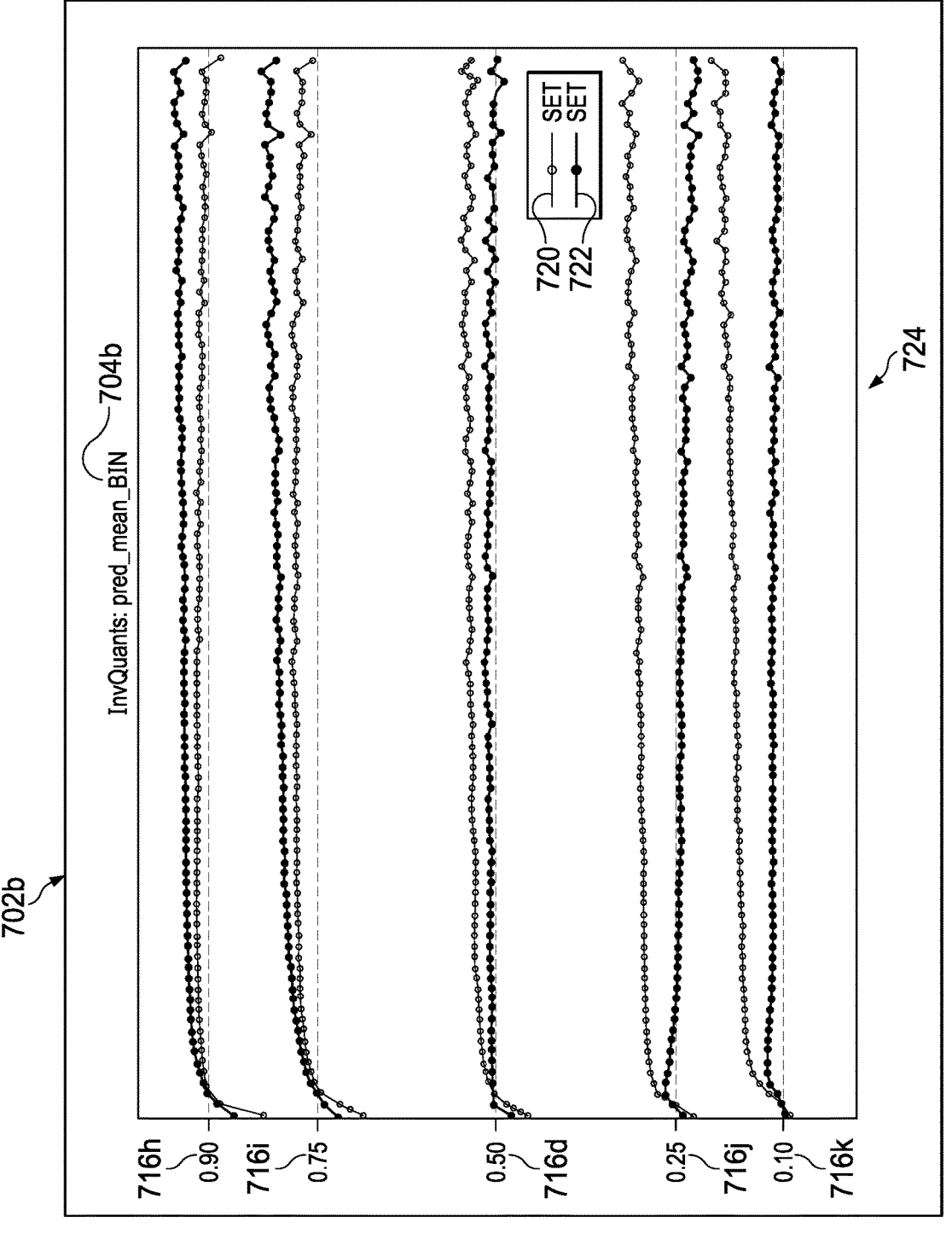

FIGS. 7A-7B illustrate exemplary inverse quantile plot displays 702a and 702b generated by user interface module 212, according to an embodiment. In the embodiments illustrated by FIGS. 7A-7B, at action 312 of method 300, prediction evaluation module 214 evaluates the accuracy of probability density estimations using the qualitative method of inverse quantile plot comparisons. Although particular examples of inverse quantile plot displays 702a and 702b are illustrated and described herein, embodiments contemplate prediction evaluation module 214 generating, and user interface module 212 displaying, probability density function displays of any configuration and displaying any database 114 data, according to particular needs.

FIG. 7A illustrates inverse quantile profile plot 704a for five separate sets of exemplary probability density estimation/observed data combinations (in this example, broad combination column 706, narrow combination column 708, over combination column 710, under combination column 712, and uniform combination column 714) according to an embodiment. The embodiment illustrated by FIG. 7A comprises seven inverse quantile variable lines 716a-g (respectively, 0.98 line 716a, 0.84 line 716b, 0.70 line 716c, 0.50 line 716d, 0.30 line 716e, 0.16 line 716f, and 0.02 line 716g). Each of inverse quantile variable lines 716a-g represents the percentage of probability density estimation/observed data combinations for which the observed data point should be above and below the quantile of the predicted PDF indicated by that inverse quantile variable lines 716a-g (for example, 0.50 line 716d indicates that 50% of all probability density estimation/observed data combinations in a given set of data should fall above 0.50 line 716d, and 50% should fall below 0.50 line 716d, respectively). By observing the number of samples, indicated with shaded circles 718 in FIG. 7A, that do in fact fall above and below particular inverse quantile variable lines 716a-g, prediction evaluation module 214 evaluates the accuracy of probability density estimations in a probability density estimation/observed data set.

According to embodiments, and as illustrated in FIG. 7A, broad combination column 706 and narrow combination column 708 suggest the variance estimation model is not generating accurate variance estimates with respect to broad combination column 706 and narrow combination column 708. Over combination column 710 and under combination column 712 suggest the mean estimation model is not generating accurate mean estimates with respect to Over combination column 710 and under combination column 712. Uniform combination column 714 indicates that all shaded circles 718 associated with uniform combination column 714 fall on expected inverse quantile variable lines 716a-g, suggesting that that machine learning system 110's mean and variance estimations as well as choice of underlying PDF (such as but not limited to negative binomial distribution or quantile regression) were correct with respect to the embodiment illustrated by uniform combination column 714.

The embodiment illustrated by FIG. 7B illustrates inverse quantile profile plots 704b for two sets (illustrated in FIG. 7B as set 720 and set 722, respectively) of exemplary probability density estimation/observed data combinations, according to an embodiment. In this embodiment, two separate models (for the purposes of this example, the "Set 720 Model" and the "Set 722 Model") generate sets 720 and 722, respectively, of exemplary probability density estimation/observed data combinations, where the observed data is the same. Compared to FIG. 7A, where the data set is evaluated in full, in FIG. 7B the data set is divided in 100 separate mean prediction bins 724 of the predicted mean, illustrated by separate categories on the X-axis. Other embodiments not illustrated by FIG. 7B may use any other variable of the data set instead of the predicted mean. As illustrated by FIG. 7B, each of Set 720 Model and Set 722 Model is suboptimal, but Set 720 Model generates more accurate probability density function estimations for most of mean prediction bins 724 at 0.75 line 716i and 0.9 line 716h (illustrated in FIG. 7B by set 720 data points falling closer to 0.75 line 716i and 0.9 line 716h than set 722 data points), and Set 722 Model generates more accurate probability density function estimations for most of mean prediction bins 724 at 0.1 line 716k, 0.25 line 716j, and 0.5 line 716d.

The two advantages of exemplary inverse quantile plot displays 702a and 702b, as compared to exemplary CDF histogram display 502, are that inverse quantile plot displays 702a and 702b support the qualitative evaluation of the predicted individual PDFs not only globally but (1) for different specified quantiles (potentially hinting to deviations in e.g. the tails of the distributions) and (2) in dependence of arbitrary variables of the data set (potentially hinting to deviations in e.g. specific stores).

The methods and displays illustrated by FIGS. 5-7B allow a detailed qualitative evaluation of the PDF predictions. However, in order to also quantify the quality of the PDF predictions, a measure of the deviation of the PDF predictions from the optimal outcome given the observed target data is needed. For this, in an embodiment, machine learning system 110 may generate one or more prediction evaluation models. The one or more prediction evaluation models may quantitatively compute a prediction accuracy metric by comparing the CDF histogram of the predicted PDFs (embodiments of which are illustrated in FIGS. 5 and 6A-6D) with uniform distribution, with a prediction accuracy in interval of [0,1]. According to embodiments, the one or more prediction evaluation models may use one of several different methods, including but not limited to Wasserstein metric (also known as earth mover's distance) and Kullback-Leibler divergence, to compute deviance between two probability distributions. Wasserstein metric is a distance function defined between probability distributions on a given metric space and Kullback-Leibler divergence is a measure of how one probability distribution diverges from a second expected probability distribution. To measure the accuracy on a more granular level, for example separately for each store, the filling of each respective CDF histogram may be restricted with the prediction-target pairs of the store at hand.

For the purposes of this disclosure, the Wasserstein distance can be defined by the following equation (3):

$$EMD(P, Q) = \frac{\sum_{k=1}^{N} |F_P(x_k) - F_Q(x_k)|}{N} \qquad (3)$$

where $F_P$ (X) and $F_Q$ (X) are the CDFs of the two PDFs P(X) and Q(X), respectively, and $x_k$ denotes the average value of X in bin k, with X being divided in N bins. Since 0.5 represents the maximum value of the first Wasserstein distance when comparing any distribution in the support [0, 1] to a flat distribution in the same interval (its minimum being zero), we define an accuracy measure for our PDF predictions in the range [0, 1] by: accuracy=1-2·EMD.

In the case of parametric PDF estimation (for a PDF with two parameters for the mean and variance), the accuracy measurement described above combines the measurement of the accuracy of mean and variance predictions as well as the correctness of the choice of underlying PDF assumption (such as but not limited to negative binomial distribution). In other embodiments, the accuracy measurement works as well for any other method to predict full individual PDFs, including but not limited to a quantile regression.

Reference in the foregoing specification to "one embodiment", "an embodiment", or "some embodiments" means that a particular causal factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method, comprising:
    training, by a computer comprising a processor and memory, a first machine learning model to predict a mean demand of one or more items, the one or more items stored at an inventory of one or more supply chain entities;
    training, by the computer, a second machine learning model to predict a variance associated with the predicted mean demand of the one or more items, wherein the second machine learning model predicts the variance by minimizing a negative log-likelihood function;
    receiving, by the computer, current sales data for the one or more items;
    predicting, by the computer and using the trained first machine learning model, the trained second machine learning model, and the received current sales data, a negative binomial variance of demand of the one or more items, the negative binomial variance of demand comprising a confidence interval;
    generating, by the computer, an individual probability density function, using the predicted mean demand of one or more items and the predicted negative binomial variance of demand as probability density function parameters of a distribution;
    evaluating, by the computer, the generated individual probability density function;
    initiating, by the computer, manufacturing of one or more components based, at least in part, on the predicted mean demand; and
    setting, by the computer, inventory levels of the one or more items at one or more stocking points.

2. The computer-implemented method of claim 1, further comprising the computer evaluating the generated individual probability density function using one or more qualitative evaluation methods.

3. The computer-implemented method of claim 1, further comprising:
    rendering, by the computer and for display on a user interface, a demand prediction feature explanation and evaluation visualization comprising the predicted mean demand of one or more items, the predicted negative binomial variance of demand, and the evaluated generated individual probability density function.

4. The computer-implemented method of claim 1, further comprising the computer evaluating the generated individual probability density function using one or more quantitative evaluation methods.

5. The computer-implemented method of claim 2, wherein at least one of the one or more qualitative evaluation methods comprises one or more methods selected from the list of:
    cumulative distribution function histogram comparisons; and
    inverse quantile plot comparisons.

6. The computer-implemented method of claim 4, wherein at least one of the one or more quantitative evaluation methods comprises:
    generating, by the computer, a cumulative distribution function histogram of the generated individual probability density function; and
    comparing, with the computer, the generated cumulative distribution function histogram of the generated individual probability density function to a uniform distribution.

7. The computer-implemented method of claim 6, wherein the computer compares the generated cumulative distribution function histogram of the generated individual probability density function to the uniform distribution using one or more of:
    a Wasserstein metric; and
    a Kullback-Leibler divergence.

8. A system comprising a computer, the computer comprising a processor and memory and configured to:
    train a first machine learning model to predict a mean demand of one or more items, the one or more items stored at an inventory of one or more supply chain entities;
    train a second machine learning model to predict a variance associated with the predicted mean demand of the one or more items, wherein the second machine learning model predicts the variance by minimizing a negative log-likelihood function;
    receive current sales data for the one or more items;
    predict, using the trained first machine learning model, the trained second machine learning model, and the received current sales data, a negative binomial variance of demand of the one or more items, the negative binomial variance of demand comprising a confidence interval;
    generate an individual probability density function, using the predicted mean demand of one or more items and the predicted negative binomial variance of demand as probability density function parameters of a distribution;
    evaluate the generated individual probability density function;
    initiate manufacturing of one or more components based, at least in part, on the predicted mean demand; and
    set, by the computer, inventory levels of the one or more items at one or more stocking points.

9. The system of claim 8, further comprising the computer:

evaluating the generated individual probability density function using one or more qualitative evaluation methods.

10. The system of claim 8, further comprising the computer:

rendering, for display on a user interface, a demand prediction feature explanation and evaluation visualization comprising the predicted mean demand of one or more items, the predicted negative binomial variance of demand, and the evaluated generated individual probability density function.

11. The system of claim 8, further comprising the computer:

evaluating the generated individual probability density function using one or more quantitative evaluation methods.

12. The system of claim 9, wherein at least one of the one or more qualitative evaluation methods comprises one or more methods selected from the list of:

cumulative distribution function histogram comparisons; and inverse quantile plot comparisons.

13. The system of claim 11, wherein at least one of the one or more quantitative evaluation methods comprises:

generating a cumulative distribution function histogram of the generated individual probability density function; and comparing, the generated cumulative distribution function histogram of the generated individual probability density function to a uniform distribution.

14. The system of claim 13, wherein the computer compares the generated cumulative distribution function histogram of the generated individual probability density function to the uniform distribution using one or more of:

a Wasserstein metric; and a Kullback-Leibler divergence.

15. A non-transitory computer-readable storage medium embodied with software, the software when executed configured to:

train a first machine learning model to predict a mean demand of one or more items, the one or more items stored at an inventory of one or more supply chain entities;

train a second machine learning model to predict a variance associated with the predicted mean demand of the one or more items, wherein the second machine learning model predicts the variance by minimizing a negative log-likelihood function;

receive current sales data for the one or more items;

predict, using the trained first machine learning model, the trained second machine learning model, and the received current sales data, a negative binomial variance of demand of the one or more items, the negative binomial variance of demand comprising a confidence interval;

generate an individual probability density function, using the predicted mean demand of one or more items and the predicted negative binomial variance of demand as probability density function parameters of a distribution;

evaluate the generated individual probability density function;

initiate manufacturing of one or more components based, at least in part, on the predicted mean demand; and set, by the computer, inventory levels of the one or more items at one or more stocking points.

16. The non-transitory computer-readable storage medium of claim 15, wherein the software when executed is further configured to:

evaluate the generated individual probability density function using one or more qualitative evaluation methods.

17. The non-transitory computer-readable storage medium of claim 15, wherein the software when executed is further configured to:

render, for display on a user interface, a demand prediction feature explanation and evaluation visualization comprising the predicted mean demand of one or more items, the predicted negative binomial variance of demand, and the evaluated generated individual probability density function.

18. The non-transitory computer-readable storage medium of claim 15, wherein the software when executed is further configured to:

evaluate the generated individual probability density function using one or more quantitative evaluation methods.

19. The non-transitory computer-readable storage medium of claim 16, wherein at least one of the one or more qualitative evaluation methods comprises one or more methods selected from the list of:

cumulative distribution function histogram comparisons; and inverse quantile plot comparisons.

20. The non-transitory computer-readable storage medium of claim 18, wherein at least one of the one or more quantitative evaluation methods comprises:

generating a cumulative distribution function histogram of the generated individual probability density function; and comparing, the generated cumulative distribution function histogram of the generated individual probability density function to a uniform distribution.

* * * * *